US008868368B2

(12) United States Patent
Heath

(10) Patent No.: US 8,868,368 B2
(45) Date of Patent: Oct. 21, 2014

(54) MOTION SMOOTHING IN 3-D POSITION SENSING APPARATUS

(75) Inventor: Thomas Peter Heath, Bridgnorth (GB)

(73) Assignee: Performance Designed Products LLC, Sherman Oaks, CA (US)

(*) Notice: Subject to any disclaimer, the term of this patent is extended or adjusted under 35 U.S.C. 154(b) by 821 days.

(21) Appl. No.: 12/881,093

(22) Filed: Sep. 13, 2010

(65) Prior Publication Data

US 2011/0071785 A1 Mar. 24, 2011

Related U.S. Application Data

(63) Continuation of application No. PCT/GB2009/000873, filed on Apr. 2, 2009.

(51) Int. Cl.
*G01C 17/38* (2006.01)
*G01S 15/66* (2006.01)
*G01C 21/16* (2006.01)

(52) U.S. Cl.
CPC ............... *G01C 21/165* (2013.01); *G01S 15/66* (2013.01)
USPC .............................. 702/95; 702/153; 702/96

(58) Field of Classification Search
CPC ....... G01C 21/165; G01B 7/003; G01B 7/004
USPC .................................... 702/96, 145, 152, 153
See application file for complete search history.

(56) References Cited

U.S. PATENT DOCUMENTS

| 6,176,837 | B1* | 1/2001 | Foxlin ........................... 600/595 |
| 7,844,415 | B1* | 11/2010 | Bryant et al. ................. 702/151 |
| 2005/0032582 | A1* | 2/2005 | Mahajan et al. .............. 473/222 |
| 2005/0081629 | A1* | 4/2005 | Hoshal ........................ 73/504.03 |
| 2006/0130594 | A1* | 6/2006 | Ikeuchi ....................... 73/862.08 |
| 2009/0070060 | A1* | 3/2009 | Bang et al. ....................... 702/96 |

FOREIGN PATENT DOCUMENTS

WO WO 2007015134 A2 * 2/2007

* cited by examiner

*Primary Examiner* — John Breene
*Assistant Examiner* — Timothy H Hwang
(74) *Attorney, Agent, or Firm* — Sheppard Mullin Richter & Hampton LLP

(57) ABSTRACT

A method of estimating and extrapolating the position of an article is provided. The article's position is detected by relatively infrequent ultrasonic ranging, and provides more frequent reports from internal accelerometers, gyroscopes and optional magnetometers. In a first instance, the method includes calculating new position, velocity and orientation vectors by linearly interpolating between the readings of the sensors at two times. In a second instance, the method includes estimating the orientation of the article by calculating the duration of a timeslice, making a rotational increment matrix and taking the product of the initial orientation and the increment matrix for the appropriate number of timeslices. In a third instance, the method includes calculating the acceleration of an article between three ultrasonically determined locations and recalibrating the accelerometers to align the measured acceleration with the calculated acceleration.

12 Claims, 2 Drawing Sheets

MOTION SMOOTHING IN 3-D POSITION SENSING APPARATUS

CROSS-REFERENCE TO RELATED APPLICATIONS

This application is a continuation of and claims the benefit of International Application Number PCT/GB2009/000873 filed Apr. 2, 2009, which is hereby incorporated herein by reference in its entirety.

FIELD OF THE INVENTION

This invention relates to continuous positional and orientational tracking of an object in three dimensions, and optionally, the use of tracking data to control an onscreen pointer.

DESCRIPTION OF THE RELATED ART

There is a desire to be able to accurately and continuously track the position of a handheld controller of the type described in WO-A-2007/003126, in conjunction with suitable software. The prior art hardware is limited in that position is given less frequently than desired. For example, a gaming application may require a positional update 60 times a second in view of the expected frame rate of the gaming applications. In practice a typical minimum repeat period for ultrasonic measurements is of the order of 33 to 132 ms. Thus there is a need to use other sources of information to accurately fill in the data between these known positions.

BRIEF SUMMARY OF EMBODIMENTS OF THE INVENTION

In accordance with a first aspect of the invention there is provided a method of estimating position and orientation of an article comprising reading the orientation of the article from three gyroscopes mounted on the article and reading the acceleration of the article from three accelerometers mounted on the article and further comprising estimating a continuous position (vector $\underline{P}$), velocity (vector $\underline{V}$) and orientation (matrix O) of an article at time T, between T and an initial time $T_0$ where: initial position vector=$\underline{P}_0$; initial velocity vector=$\underline{V}_0$; initial orientation matrix=$O_0$; initial rotational velocity, relative to the article, vector=$\underline{R}_0$; initial acceleration, relative to the article, vector=$\underline{A}_0$ and comprising re-calculating (vector $\underline{P}$), velocity (vector $\underline{V}$) and orientation (matrix O) at a subsequent time $T_1$ using new information from the accelerometers and gyroscopes where: new acceleration relative to the object vector=$\underline{A}_1$; new rotational velocity relative to the object vector=$\underline{R}_1$; the re-calculation being carried out by, linearly interpolating from $R_0$ to $R_1$ to discover the local rotational velocity at any time between $T_0$ and $T_1$, and by linearly interpolating from $A_0$ to $A_1$ to discover the local acceleration.

Optionally, the article may further comprise three magnetic sensors mounted therein, the method further comprising estimating a continuous position (vector $\underline{P}$), velocity (vector $\underline{V}$) and orientation (matrix O) of an article at time T, between T and an initial time $T_0$ where: initial direction of fixed magnetic field, relative to the article, vector=$\underline{F}_0$ (in angular units) and comprising re-calculating (vector $\underline{P}$), velocity (vector $\underline{V}$) and orientation (matrix O) at a subsequent time $T_1$ using new information from the accelerometers, gyroscopes and magnetometers where: new direction of fixed magnetic field, relative to the article, vector=$\underline{F}_1$ (in angular units); the re-calculation being carried out by linearly interpolating from $F_0$ to $F_1$ to discover the local direction of fixed magnetic field.

According to a second aspect of the invention there is provided a method of estimating position and orientation of an article comprising extrapolating a position (vector $\underline{P}$), and orientation (matrix O) of the article at time T, moveable from an initial state at time $T_0$, described by: initial position vector $\underline{P}_0$, initial velocity vector $\underline{V}_0$, initial orientation matrix $O_0$ (in angular units), and initial rotational velocity, relative to the article, vector $R_0$, further comprising calculating the duration of a timeslice $T_{Slice}=(T-T_0)/N$, where N tends to zero, making a rotational increment matrix (M) to create a rotation matrix from a rotation expressed as a vector of components representing x, y, and z axes of rotation: M=MatrixCreate $(T_{Slice}*\underline{R}_0)$, where the estimated orientation and estimated position are given as O=M1×M2×M3× . . . ×MN×O0 and $\underline{P}=\underline{P}_0+\underline{V}(T-T_0)$ respectively.

Optionally, either method may further comprise using ultrasonic readings to correct the velocity estimates and thereby estimated position, by modifying the historical velocity estimate when each new ultrasonic reading is received, to make the estimated position match the position given by the new ultrasonic measurement.

According to a third aspect of the invention there is provided a method of estimating position and orientation of an article comprising correcting orientation, and optionally velocity, by taking a plurality of readings from the output of three accelerometers mounted on the article, using three positions given by ultrasonic time-of-f light measurements, during transit between the first, second and third ultrasonic-derived positions, assuming that acceleration of the article between the first to the third the positions was substantially constant and verifying this against the plurality of accelerometer readings, calculating the acceleration vector at the second the position using the position and time information about the three known positions and comparing that calculated acceleration vector with one obtained from the accelerometers, and thereby re-calibrating the measurements taken from the accelerometers.

In other aspects, the invention provides a computer program product carrying program steps which when executed on suitable hardware causes the hardware to carry out the steps of the any of the claimed methods and a method of controlling an on-screen pointer, comprising using the position and orientation information of the article derived using any preceding claim, and determining where a line through a predetermined one of the article's axes intersects a plane, which plane may be the plane of the screen.

Position may be sensed using ultrasonic time-of-flight measurements between fixed and mobile components (such as a handheld games controller), with the readings supplemented by interim readings from accelerometers and gyroscopes. Optionally, magnetometers may be used to provide an absolute directional reference based on the earth's magnetic field or an artificially generated field. The ultrasonic measurement may, for example, be as described in our co-pending WO-A-2007/003126, the disclosure of which is incorporated herein by reference.

In taking interim readings from accelerometers and gyroscopes (and optionally magnetometers), it is necessary to ascertain the orientation of the controller in order that the on-board sensors can be interpreted correctly—such orientation knowledge also provides a second application; that of achieving control of an onscreen pointer with the controller.

In summary, the invention allows determination of complete real-time movement and orientation of a hand-held controller. The system is able to ascertain motion and orientation, provided by preferably 3 orthogonal accelerometers and preferably 3 orthogonal gyroscopes (and optionally magnetometers) respectively, to describe the motion, but with constant feedback/correction from every reliable ultrasonic position received. Thus the subsequent motion is governed by the ultrasonic positions, with the inertial guidance of the accelerometers and gyroscopes filling in the motion for the microseconds in-between ultrasonic position readings.

The small mismatches between the predicted position, the actual next ultrasonic position, and the extraction of the underlying motion from just ultrasonic readings, are used to calibrate the electronic components of the system, in an attempt to reduce errors to zero. In addition, this live-calibration substantially eliminates linear velocity drift from the accelerometers, and rotational drift from the gyroscopes enabling accurate knowledge of the controller's rotation and thus operation as a pointer. Such feedback also allows complete recovery from any initial conditions or an errored state.

BRIEF DESCRIPTION OF THE DRAWINGS

Embodiments of the invention will now be described by way of example and with reference to the drawings in which.

DETAILED DESCRIPTION OF THE EMBODIMENTS OF THE INVENTION

Figure 1:
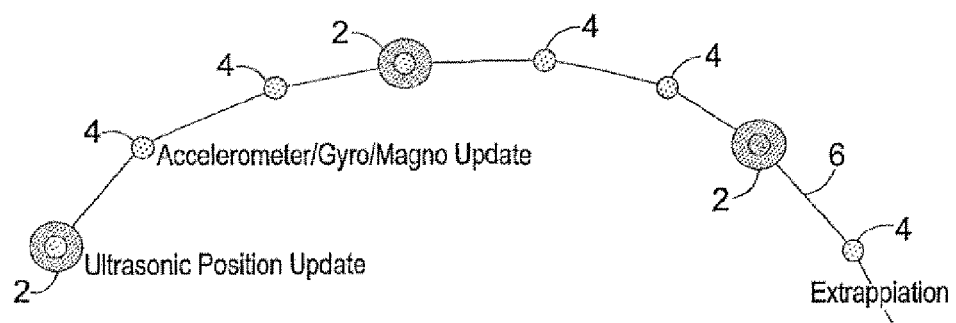
FIG. 1 is a schematic diagram showing the estimation problem.

The term "gyroscope", and derivatives thereof, is used herein to refer to orientation detecting means having a similar function to a gyroscope or gyroscopic sensor. This term is used to include, but is in no means limited to, devices such as gyroscopes; fiber optic gyroscopes; laser gyroscopes; vibrating structure gyroscopes and magnetohydrodynamic sensors. The term is intended to encompass a single such detecting means or group thereof acting jointly or independently. This term is also used to refer to pairs accelerometers arranged to produce similar readings to those of gyroscopes, which may be through an electronic or software interface. In particular, where three gyroscopes are referred to in combination in order to provide rotational information about an article around three non-parallel axes, the skilled man will realize that different gyroscopic sensors may be able to produce the desired information from a greater or smaller number of individual sensors. For example, whilst three vibrating structure gyroscopes may be required to provide complete rotational information in three dimensions, a single "traditional" gyroscope may be able to provide all of this information. Furthermore, the skilled man will realize that while some gyroscopes provide orientation data and others rotational acceleration data, these two data may be interconverted, so allowing the requirements of the invention to be fulfilled.

A handheld controller or mobile component of the type described in WO-A-2007/003126 is augmented with sensors able to measure orientation and acceleration in three orthogonal axes such as three, preferably orthogonally mounted, gyroscopes and three, preferably orthogonally mounted, accelerometers. These extra sensors can be polled more rapidly than the ultrasonic measurement system and by tracking relative movement of the controller, allow interpolation and extrapolation of the ultrasonic measurements of position and also allow orientation of the controller to be measured. The gyroscopes may be supplemented with magnetometers to further improve orientation sensing.

The system seeks to calculate substantially continuous position and orientation of an object such as a handheld games controller or pointer, here referred to as "mobile component" from the following discrete information:

Approximate position of a mobile component every 33-132 ms, by triangulating the times of flight of an ultrasonic pulse travelling from the component to 3 or more sensors of known position, separated by 20 cm or more from each other.

Approximate resultant acceleration of the mobile component, every 11 ms, by reading 3 accelerometers attached to the mobile component and oriented at preferably at 90 degrees to each other and necessarily non-parallel to one another. This acceleration is relative to the mobile component, because the accelerometers are mounted on the component itself.

Approximate rotational velocity of the component, every 11 ms, by reading 3 gyroscopes mounted to the mobile component preferably at 90 degrees to each other and necessarily non-parallel to one another. This rotational velocity is relative to the component, because the gyroscopes are mounted on the component itself.

Optionally, the rotational offset of the mobile component from the vector of the local magnetic field, whether it is that of the Earth, or artificially induced, every 11 ms, by reading 3 magnetometers preferably at 90 degrees to each other and necessarily non-parallel to one another, again mounted on the component.

It will be appreciated that all the values above are necessarily approximate because the hardware will be affected by noise, and may also suffer from errors in alignment, or errors from incorrect centering and calibration. It is therefore preferable that the method described below is robust and stable, even given the imprecise nature of its inputs.

In addition, the method is preferably able to recover from a complete absence of data, and return rapidly to the correct position and orientation.

The method also allows any data that is assessed to be unreliable to be disregarded without undue error or instability.

FIG. 1 shows the core problem. Relatively infrequent ultrasonic positional data points 2, are relatively reliable in terms of accuracy. More frequent updates 4 from the other hardware components (accelerometers, gyroscopes and optional magnetometers), which can contribute information to the controller's situation are also available. However, instead of simply knowing the object's position at the positions 2, the problem demands being able to calculate it at any intermediate points on the line 6 which interconnects the points 2 and 4.

Using the methods described below, the position and orientation can be tracked, extrapolated beyond the last data input, enhanced when data is received and fed back with a number of corrections to counter drilling and error that is inherent in real hardware applications. The methods may be used separately, or preferably, in combination.

Method 1 Overview

This method allows the estimation of a continuous position (vector P), and orientation (matrix O) of an article at time T, moveable from an initial situation at time T0, described by:
1. position, (vector $\underline{P}_0$ in meters)
2. velocity, (vector $\underline{V}_0$ in meters/second)
3. orientation (matrix $O_0$ in radians)
4. rotational velocity relative to the object (vector $\underline{R}_0$ in radians/second)

Figure 2:
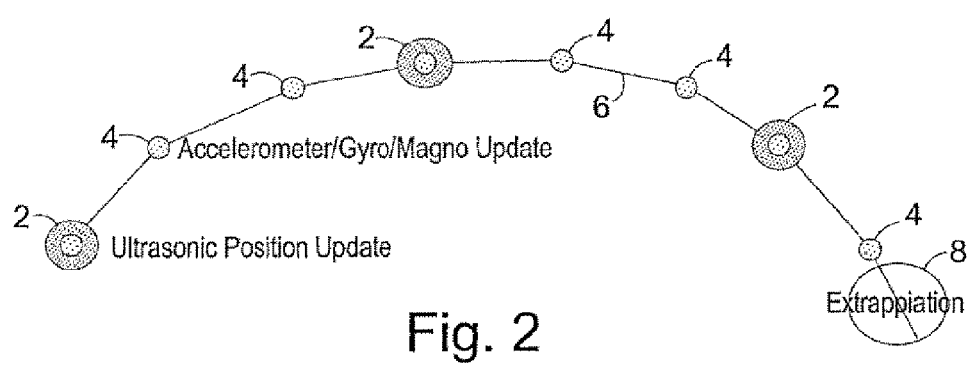
FIG. 2 is a schematic diagram showing extrapolation of a trajectory.

With reference to FIG. 2, this method is used to extrapolate the line 6 onwards from the last data input received from the controller. On the diagram, this extrapolation is marked by circle 8. This line represents an estimate of the trajectory of the mobile component which is being tracked.

This method is now described in more detail.

Initially we assume zero linear and rotational acceleration over the intervening time between $T_0$ and T. However, this method may be extended to accommodate these initial acceleration values being non-zero.

For simplicity, we detail updating of the orientation, by incrementing in small time slices. The smaller the slices are made, the more accurate the method becomes and, ultimately mathematical integration may be used as the size of time slice tends to zero if needed. We choose to subdivide the time period $(T-T_0)$ into N time slices, where, in a preferred embodiment, N is a chosen whole number giving each time slice a duration of approximately 10 ms.

Duration of the timeslice is calculated: $T_{Slice}=(T-T_0)/N$

Make a rotational increment matrix (M) using a standard function (MatrixCreate) such as the Microsoft® DirectX® 9 function D3DXMatrixRotationYawPitchRoll, to create a rotation matrix from a rotation expressed as a vector of components representing x, y, and z axes of rotation:

$M=\text{MatrixCreate}(T_{Slice}*\underline{R}_0)$ $O=M\times M2 \times M3 \times \ldots \text{ (with N instances of M)} \ldots \times O_0$ $\underline{P}=\underline{P}_0+V(T-T_0)$ This provides a representation of an extrapolated portion of the line 8 which may be fed back to an application seeking positional information since the last accelerometer/gyroscope/magnetometer reading 4.

Method 2 Overview

This method allows estimation of a continuous position (vector $\underline{P}$), velocity (vector V) and orientation (matrix O) of an article at time T, which is between (and including) an initial time $T_0$ with its situation described by:
1. position, (vector $\underline{P}_0$ in meters)
2. velocity, (vector $\underline{V}_0$ in meters/second)
3. orientation (matrix $O_0$ in radians)
4. rotational velocity relative to the object (vector $\underline{R}_0$ in radians/second)
5. acceleration relative to the object (vector $\underline{A}_0$ in meters/seconds$^2$)
6. optional direction of fixed magnetic field, relative to the object (vector $\underline{F}_0$ in radians)
and a subsequent time $T_1$ at which time the following additional information becomes known, by virtue of new data from the accelerometers, gyroscopes and magnetometers:
1. acceleration relative to the object (vector $\underline{A}_1$ in meters/seconds$^2$)
2. rotational velocity relative to the object (vector $\underline{R}_1$ in radians/second)
3. direction of fixed magnetic field, relative to the object (vector $\underline{F}_1$ in radians)

Figure 3:
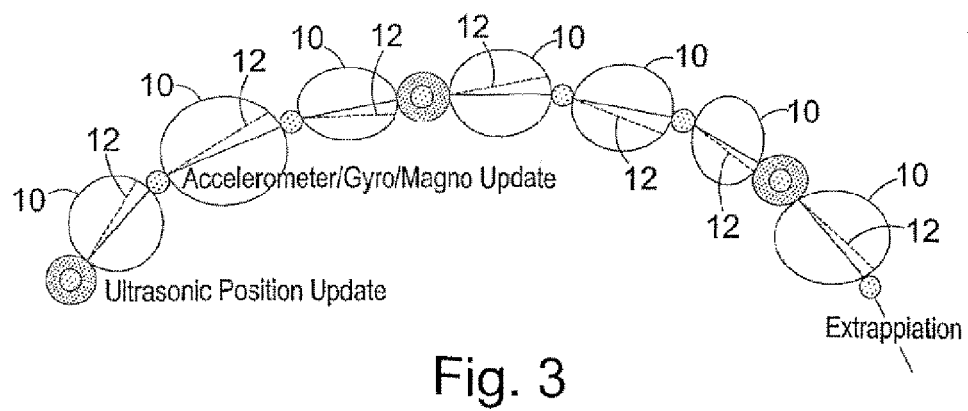
FIG. 3 is a schematic diagram showing correction of historical extrapolation estimates.

With reference to FIG. 3, this method is used to amend the preceding motion data when a new batch of accelerometer/gyroscope/magnetometer data comes in. This can be used retrospectively to correct the extrapolation derived in the method described above. Each of the parts of the line marked by circles 10 was established via this method; corrected from their previously extrapolated values which are indicated by broken lines 12.

This method allows calculation of the situation at time $T_1$, which can then be used as the initial conditions (at time $T_0$) for the first method above.

This method is now described in detail.

Again for simplicity, we consider updates over a small timeslice. Again we choose to subdivide the time period $(T-T_0)$ into N time slices, where N is a whole number typically giving each time slice a duration of approximately 10 ms.

From $R_0$ and $R_1$, we linearly interpolate to discover the local (relative to object) rotational velocity at any time between $T_0$ and $T_1$. Similarly we linearly interpolate the local acceleration, and direction of fixed magnetic field.

We iterate through the N time slices. In practice this is desirable in order to save out historical data, for processing by the end application of the controller. For each time-slice one can see that the initial data is available from the initial conditions for the first one, and then subsequently from the endpoint of the prior time-slice.

Duration of the time-slice is calculated: $T_{Slice}=(T-T_0)/N$

Increment rotation velocity per half slice:
$\underline{R}_{Half\_inc}=\frac{1}{4}*(\underline{R}_0+\underline{R}_1)*T_{Slice}$;

Increment acceleration per half slice: $\underline{A}_{Half\_inc}=\frac{1}{4}*(\underline{R}_0+\underline{R}_1)*T_{Slice}$.

Increment magnetic field per half slice: $\underline{F}_{Half\_inc}=\frac{1}{4}*(\underline{F}_0+\underline{F}_1)*T_{Slice}$;

So, for each of N time-slices:
(We preferably use values in the middle of the time-slices as the best representation of the values across the whole time-slice.)

$\underline{R}_{MidSlice}=\underline{R}_{StartSlice}+\underline{R}_{Half\_inc}$ $\underline{R}_{EndSlice}=\underline{R}_{MidSlice}+\underline{R}_{Half\_inc}$ $\underline{A}_{MidSlice}=\underline{A}_{StartSlice}+\underline{A}_{Half\_inc}$ $\underline{A}_{EndSlice}=\underline{A}_{MidSlice}+\underline{A}_{Half\_inc}$ $\underline{F}_{MidSlice}=\underline{F}_{StartSlice}+\underline{F}_{Half\_inc}$ $\underline{F}_{EndSlice}=\underline{F}_{MidSlice}+\underline{F}_{Half\_inc}$ Increment rotational matrix for half a time slice: $M=\text{MatrixCreate}(R_{MidSlice})$ $O_{MidSlice}=M*O_{StartSlice}$ The direction of the true magnetic field $\underline{F}_{True}$ is known, and we have a direction given by $\underline{F}_{MidSlice}$ that should match it, provided we transform $\underline{F}_{MidSlice}$ back into world space (it's relative to the controller at present).

Hence we rotate $O_{MidSlice}$ by the shortest rotation such that $(O_{MidSlice}^{-1}*\underline{F}_{MidSlice})$ is aligned with $\underline{F}_{True}$;

$O_{EndSlice}=M*O_{MidSlice}$

Similarly we correct $O_{EndSlice}$ by reference to rotating by the shortest rotation such that $(O_{MidSlice}^{-1}*\underline{F}_{EndSlice})$ is aligned with $\underline{F}_{True}$;

Now calculate average world acceleration $\underline{A}_w$ for this slice from the averages.

$$\underline{A}_w = O_{MidSlice} \times \underline{A}_{MidSlice}$$

So use this acceleration in the equations of motion for this slice.

$$\underline{P}_{EndSlice} = \underline{P}_{StartSlice} + (V_{StartSlice} * T_{Slice}) + (\tfrac{1}{2} * \underline{A}_w * T_{Slice}^2)$$

$$\underline{V}_{EndSlice} = \underline{V}_{StartSlice} + (\underline{A}_w * T_{Slice})$$

Finally, we read off the values from the end of Nth slice to give us $\underline{P}$, $\underline{V}$, and O.

Method 3 Overview

This method uses ultrasonic readings to correct linear velocity estimates, and thus position.

Every time a new ultrasonic reading is received, it is treated as the correct location, and the historical velocity estimate of the object is modified in such a way that the tracked position becomes correct at this point in time.

Figure 4:
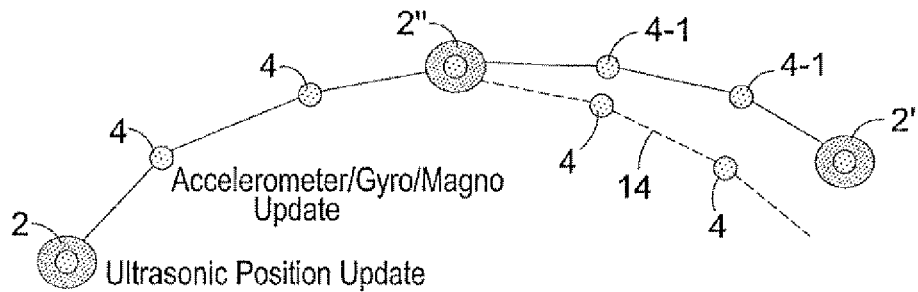
FIG. 4 is a schematic diagram showing correction of historical positional estimates after a velocity correction.

With reference to FIG. 4, the dotted path 14 represents the path which was being tracked, complete with its interim corrections 4 from the more frequent accelerometer/gyroscope/magnetometer updates, and even an extrapolation up until the point of our most recent position. Now, when the ultrasonic position 2' is received, we adjust the velocity at the time of the last ultrasonic reading 2'', such that the subsequent motion puts our tracked position at exactly the position the ultrasonics are now telling us. As a consequence of this velocity correction, we will see that the position is also corrected and the assumed positions of the accelerometer/gyroscope/magnetometer updates are adjusted to new positions 4-1.

The method is now described in more detail.

A new ultrasonic position (vector $\underline{P}$), is received at time T. Using the methods of tracking the object which are described above, we calculate our position to be vector $\underline{P}_0$.

Historically, we received our last ultrasonic position at time T0, and since we are using this method where calculated and ultrasonic positions are synchronized, we can assume that this was the case at time T0.

Therefore in time (T−T$_0$), our position has deviated by ($\underline{P}_0$−$\underline{P}$), and we calculate the extra velocity we should have had since time T$_0$ in order for that deviation to be zero.

$$V_{Increment} = (\underline{P} - \underline{P}_0)/(T - T_0)$$

This velocity increment propagates through the historical data to the present moment, yielding a current velocity that is increased by the increment and a new calculated $\underline{P}_0$ that exactly matches $\underline{P}$.

Because it is a velocity change, the position curve remains continuous. However, it can be noted that there will be a step/discontinuity in the velocity at time T$_0$, which could be post-processed if continuity is required in the historical velocity data, as well as smoothness in the historical position data.

Method 4 Overview

This method corrects orientation, and optionally velocity, by taking a plurality of readings from the output of three accelerometers mounted at preferably at 90 degrees to each other and necessarily non-parallel to one another on the article, during transit between the three known positions, assuming that acceleration of the article between the first to the third known positions was substantially constant and verifying this against the plurality of accelerometer readings, calculating the acceleration vector at the second known position using the position and time information about the three known positions and comparing that calculated acceleration vector with the one obtained from the accelerometers (once rotated back into world space from the local space of the article).

Figure 5:
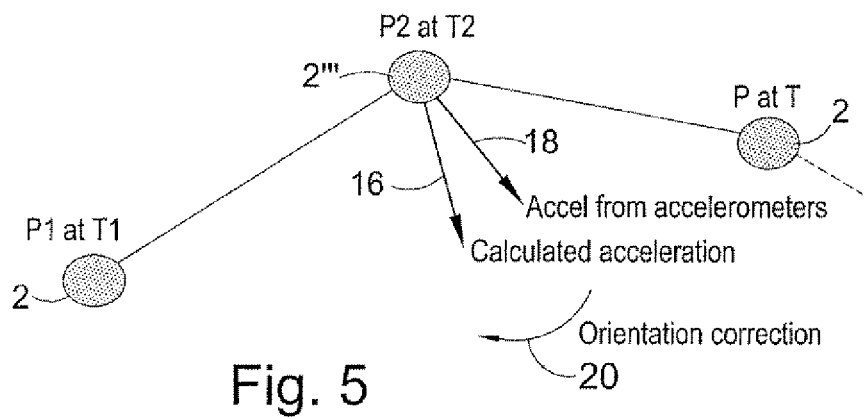
FIG. 5 is a schematic diagram showing calculation of an acceleration vector from three ultrasonic position readings.

With reference to FIG. 5, 3 ultrasonic positions 2 are given with their associated times. An acceleration vector 16 is calculated from that data, and an estimated vector 18 is based on accelerometer readings. An orientation correction 20 is then given to align these two vectors 16 and 18 which should represent the same thing.

Figure 6:
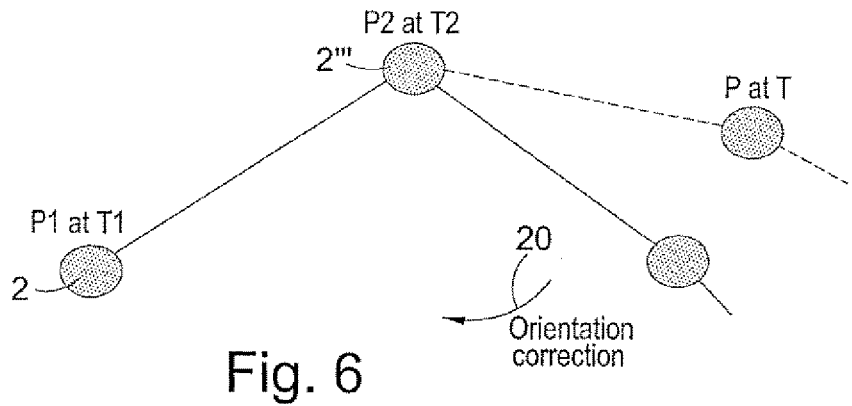
FIG. 6 is a schematic diagram showing recalculated orientation following accelerometer re-calibration.

The orientation change to correct vector 18 to match vector 16 is calculated and applied to historical calculations from the time of the second ultrasonic reading 2'''. This reading is chosen because it can be confirmed via former and later ultrasonic readings, whether the assumption of constant accelerations holds true. Therefore the subsequent path of the tracked article can be recalculated with corrected accelerometer readings, from the time of T$_2$ to the present—see FIG. 6.

From our calculations, we can also ascertain velocity at time T$_2$, which can be optionally fed into the calculations.

This method is now described in more detail.

Firstly we calculate the acceleration and velocity at T$_2$, using formulae derived from simultaneous equations of linear motion and the position vectors $\underline{P}_1$, $\underline{P}_2$, and $\underline{P}$ and the times T$_1$, T$_2$, and T.

Position change between $\underline{P}_1$ and $\underline{P}_2$, $\underline{P}_A = \underline{P}_2 - \underline{P}_1$ Position change between $P$ and $\underline{P}_1$, $\underline{P}_B = \underline{P} - \underline{P}_2$ Time change between $\underline{P}_1$ and $\underline{P}_2$, $T_A = T_2 - T_1$ Time change between $\underline{P}$ and $\underline{P}_1$, $T_B = T - T_1$ Then acceleration at $T_2$, $A_2 = (2*((T_A * \underline{P}_B) - (T_B * \underline{P}_A)))/(T_A * T_B * (T_A + T_B))$ And velocity at $T_2$, $V_2 = (\underline{P}_A / T_A) + (\tfrac{1}{2} * A_2 * T_A)$ Next we look at the accelerometer readings from time T$_2$, to give us the acceleration in the local frame of the controller, which must then be rotated by the inverse of the orientation matrix we have at that time. Thus we get $A_{2accel}$.

We compare the magnitudes of $A_2$ and $A_{2accel}$, to check they are consistent, i.e. say within 10%.

If so, then we adjust the orientation at time T$_2$ to align $A_{2accel}$ with $A_2$.

Optionally we may also choose to set the velocity at time T$_2$ to $V_2$.

Then recalculate our article's situation over the time, re-feeding in the inputs between T$_2$ and current time T, to arrive at a corrected history and current situation of the article.

It will be understood that preferably, and for maximum accuracy of estimates, these various methods are used together. However, they may be used separately, or alternatively in different combinations with each other.

Computer Program

The methods typically will be implemented in software with connections to hardware accelerometers, gyroscopes, magnetometers, and ultrasonic transducers. Thus the invention encompasses a computer program product, such as downloadable, software, firmware or a physical carrier such as a DVD carrying program steps which when executed on suitable hardware causes the hardware to carry out the steps of the claimed methods.

Smoothing

The resulting measured motion of the mobile component will be subject to a degree of perturbation as a result of the level of noise and error present in the system. These perturbations may be smoothed by a variety of techniques. For example, values may be blended with a proportion of their previous value and a proportion of their new value, yielding a smoothness that takes into account past values whose significance diminishes over time. Such a smoothing method can be further refined by making those proportions themselves proportional to the difference between new and old values, thus large differences may force a faster or even instant adoption of the new value, whereas small differences allow a more gradual integration of new values, promoting smoothness. This achieves a system that is both smooth, and responsive to change.

A Pointer

Since the complete motion and orientation of the object is described, the user may ascertain where a line through one of the object's axes intersects an arbitrary fixed plane, in effect allowing the object to act as a pointing device.

What is claimed is:

1. A method of tracking position, velocity and orientation of an article at a time T between time $T_0$ and time $T_1$, comprising:
   at the time $T_0$:
      measuring the acceleration ($A_0$) of the article using a plurality of accelerometers mounted on the article;
      measuring the rotational velocity ($R_0$) of the article using a plurality of gyroscopes mounted on the article;
      measuring the position ($P_0$), velocity ($V_0$), and orientation ($O_0$) of the article; and
      extrapolating the position and orientation of the article based on $A_0$, $R_0$, $P_0$, $V_0$, and $O_0$ define a first estimate of the position and orientation of the article at the time T; and
   at the time $T_1$:
      measuring the acceleration ($A_1$) of the article using the plurality of accelerometers;
      measuring the rotational velocity ($R_1$) the article using the plurality of gyroscopes;
      linearly interpolating from $R_0$ to $R_1$ to determine the rotational velocity of the article at the time T;
      linearly interpolating from $A_0$ to $A_1$ to determine the acceleration of the article at the time T; and
      determining a second corrected estimate of the position and the orientation of the article at the time T based on the linearly interpolated rotational velocity and linearly interpolated acceleration, wherein the second corrected estimate is used to correct the first estimate.

2. The method of claim 1, further comprising:
   measuring the direction of a fixed magnetic field relative to the article ($F_0$) at the time $T_0$ using a magnetometer;
   measuring the direction of the fixed magnetic field relative to the article ($F_1$) at the time $T_1$ using the magnetometer; and
   linearly interpolating from $F_0$ to $F_1$ to determine the direction of the fixed magnetic field relative to the article at the time T.

3. The method of claim 1, further comprising:
   receiving an ultrasonic position measurement of the article at a time $T_2$ subsequent to $T_1$ and using the ultrasonic position measurement to correct the second corrected estimate of the position and velocity of the article at the time T.

4. A non-transitory computer readable medium having computer executable program code embodied thereon for tracking position, velocity and orientation of an article at a time T between time $T_0$ and time $T_1$, the computer executable program code configured to cause a computing device to:
   at the time $T_0$:
      measure the acceleration ($A_0$) of the article using a plurality of accelerometers mounted on the article;
      measure the rotational velocity ($R_0$) of the article using a plurality of gyroscopes mounted on the article;
      measure the position ($P_0$), velocity ($V_0$), and orientation ($O_0$) of the article; and
      extrapolate the position and orientation of the article based on $A_0$, $R_0$, $P_0$, $V_0$, and $O_0$ to define a first estimate of the position and orientation of the article at the time T; and
   at the time $T_1$:
      measure the acceleration ($A_1$) of the article using the plurality of accelerometers;
      measure the rotational velocity ($R_1$) of the article using the plurality of gyroscopes;
      linearly interpolate from $R_0$ to $R_1$ to determine the rotational velocity of the article at the time T;
      linearly interpolate from $A_0$ to $A_1$ to determine the acceleration of the article at the time T; and
      determine a second corrected estimate of the position and the orientation of the article at the time T based on the linearly interpolated rotational velocity and linearly interpolated acceleration, wherein the second corrected estimate is used to correct the first estimate.

5. The computer readable medium of claim 4, the computer executable program code further configured to cause the computing device to:
   measure the direction of a fixed magnetic field relative to the article ($F_0$) at the time $T_0$ using a magnetometer;
   measure the direction of the fixed magnetic field relative to the article ($F_1$) at the time $T_1$ using the magnetometer; and
   linearly interpolate from $F_0$ to $F_1$ to determine the direction of the fixed magnetic field relative to the article at the time T.

6. The computer readable medium of claim 4, the computer executable program code further configured to cause the computing device to:
   receive an ultrasonic position measurement of the article at a time $T_2$ subsequent to $T_1$ and use the ultrasonic position measurement to correct the second corrected estimate of the position and velocity of the article at the time T.

7. A method of controlling an on-screen pointer, comprising:
   tracking the position, velocity, and orientation of the on-screen pointer at a time T between time $T_O$ and time $T_1$ by:
      at the time $T_0$:
         measuring the acceleration ($A_0$) of the on-screen pointer using a plurality of accelerometers mounted on the on-screen pointer;
         measuring the rotational velocity ($R_0$) of the on-screen pointer using a plurality of gyroscopes mounted on the on-screen pointer;
         measuring the position ($P_0$), velocity ($V_0$), and orientation ($O_0$) of the on-screen pointer; and
         extrapolating the position and orientation of the on-screen pointer based on $A_0$, $R_0$, $P_0$, $V_0$ and $O_0$ to define a first estimate of the position and orientation of the on-screen pointer at the time T; and
      at the time $T_1$:
         measuring the acceleration ($A_1$) of the on-screen pointer using the plurality of accelerometers;
         measuring the rotational velocity ($R_1$) of the on-screen pointer using the plurality of gyroscopes;

linearly interpolating from $R_0$ to $R_1$ to determine the rotational velocity of the on-screen pointer at the time T; and linearly interpolating from $A_0$ to $A_1$ to determine the acceleration of the on-screen pointer at the time T; and determining a second corrected estimate of the position and the orientation of the on-screen pointer at the time T based on the linearly interpolated rotational velocity and linearly interpolated acceleration, wherein the second corrected estimate is used to correct the first estimate; and using the tracked position, velocity, and orientation of the on-screen pointer to determine the on-screen pointer's direction on a screen.

8. The method of claim 7, wherein tracking the position, velocity, and orientation of the on-screen pointer at the time T further comprises:

measuring the direction of a fixed magnetic field relative to the on-screen pointer ($F_0$) at the time $T_0$ using a magnetometer;

measuring the direction of the fixed magnetic field relative to the on-screen pointer ($F_1$) at the time $T_1$ using the magnetometer; and linearly interpolating from $F_0$ to $F_1$ to determine the direction of the fixed magnetic field relative to the on-screen pointer at the time T.

9. The method of claim 7, wherein tracking the position, velocity, and orientation of the on-screen pointer at the time T further comprises:

receiving an ultrasonic position measurement of the on-screen pointer at a time $T_2$ subsequent to $T_1$ and using the ultrasonic position measurement to correct the second corrected estimate of the position and velocity of the on-screen pointer at the time T.

10. The method of claim 3, wherein the magnetometer the plurality of accelerometers, and the plurality of gyroscopes are configured to take synchronized measurements.

11. The computer readable medium of claim 6, wherein the magnetometer, the plurality of accelerometers, and the plurality of gyroscopes are configured to take synchronized measurements.

12. The method of claim 9, wherein the magnetometer, the plurality of accelerometers, and the plurality of gyroscopes are configured to take synchronized measurements.

* * * * *